United States Patent
Cao et al.

(10) Patent No.: US 10,453,660 B2
(45) Date of Patent: Oct. 22, 2019

(54) PHOTOMULTIPLIER AND METHODS OF MAKING IT

(71) Applicant: Shenzhen Genorivision Technology Co., Ltd., Shenzhen (CN)

(72) Inventors: Peiyan Cao, Shenzhen (CN); Yurun Liu, Shenzhen (CN)

(73) Assignee: Shenzhen Genorivision Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/737,817

(22) PCT Filed: Jan. 29, 2016

(86) PCT No.: PCT/CN2016/072660
§ 371 (c)(1),
(2) Date: Dec. 19, 2017

(87) PCT Pub. No.: WO2017/128271
PCT Pub. Date: Aug. 3, 2017

(65) Prior Publication Data
US 2019/0006159 A1 Jan. 3, 2019

(51) Int. Cl.
*H01J 43/22* (2006.01)
*H01J 43/18* (2006.01)
*G01T 1/208* (2006.01)

(52) U.S. Cl.
CPC .............. *H01J 43/22* (2013.01); *G01T 1/208* (2013.01); *H01J 43/18* (2013.01)

(58) Field of Classification Search
None
See application file for complete search history.

(56) References Cited

U.S. PATENT DOCUMENTS

| 5,619,100 | A | * | 4/1997 | Kyushima | ................. | H01J 9/12 |
|           |   |   |        |          |                  | 313/104   |
| 5,880,458 | A |   | 3/1999 | Shimoi et al. | | |
| 5,936,348 | A |   | 8/1999 | Shimoi et al. | | |
| 2003/0146697 | A1 | * | 8/2003 | Ishizu | ..................... | H01J 43/12 |
| | | | | | | 313/532 |

FOREIGN PATENT DOCUMENTS

| CN | 101211730 B | 11/2011 |
| CN | 101814414 B | 3/2014 |
| CN | 101814413 B | 4/2014 |

(Continued)

*Primary Examiner* — Ashok Patel
(74) *Attorney, Agent, or Firm* — IPro, PLLC; Qian Gu; Na Xu

(57) ABSTRACT

Disclosed herein is a photomultiplier comprising: an electron ejector; a detector; a substrate; and a first electrode in the substrate; a second electrode in the substrate; a third electrode in the substrate; wherein each of the first, second and third electrodes comprises a flat or curved surface at an angle to a normal direction of the substrate; wherein each of the first, second and third electrodes comprises a first end and a second end, the first end being closer to the electron ejector than the second end; wherein the first, second and third electrodes are spatially arranged such that the second ends of the first, second and third electrode are on a same plane, or such that a plane the second ends of the first and third electrodes are on crosses the second electrode.

12 Claims, 20 Drawing Sheets

(56) References Cited

FOREIGN PATENT DOCUMENTS

| | | |
|---|---|---|
| EP | 0471563 B1 | 2/1996 |
| EP | 0690478 B1 | 8/2002 |
| EP | 0911865 B1 | 12/2005 |
| WO | 9819341 A1 | 5/1998 |
| WO | 9909577 A1 | 2/1999 |
| WO | 2004088712 A2 | 10/2004 |
| WO | 2017059558 A1 | 4/2017 |

\* cited by examiner

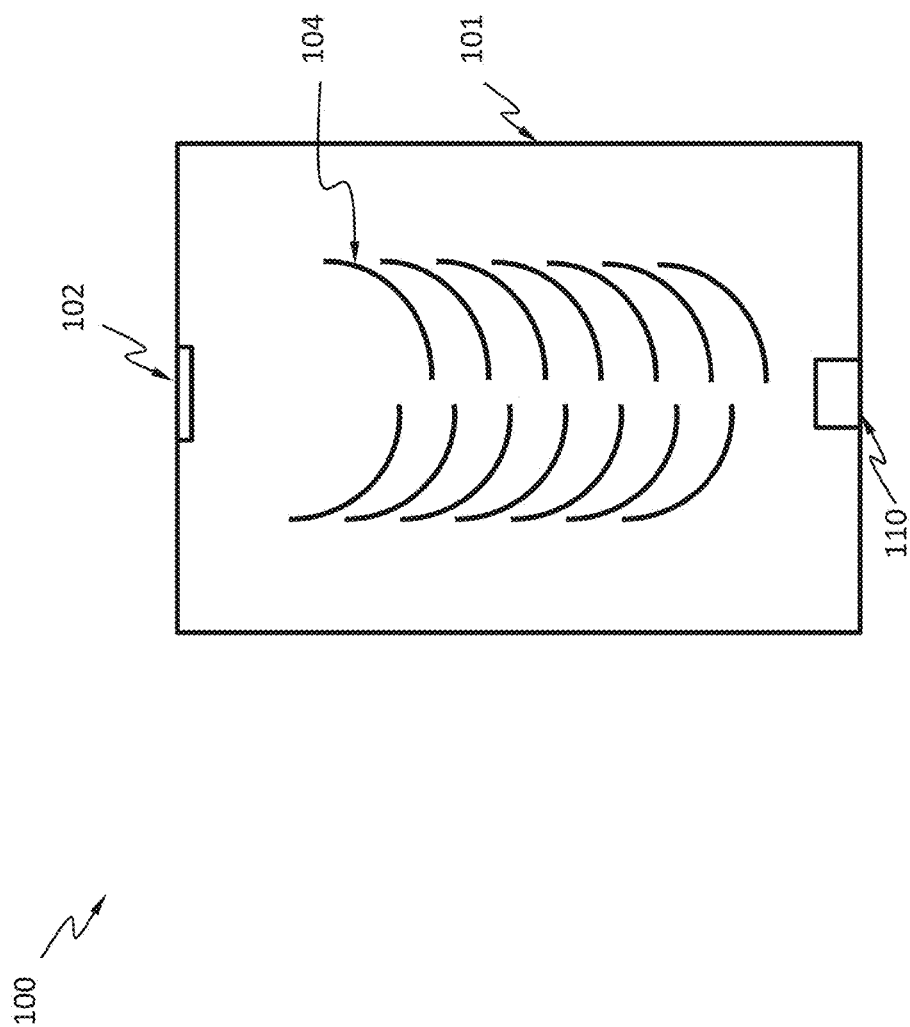

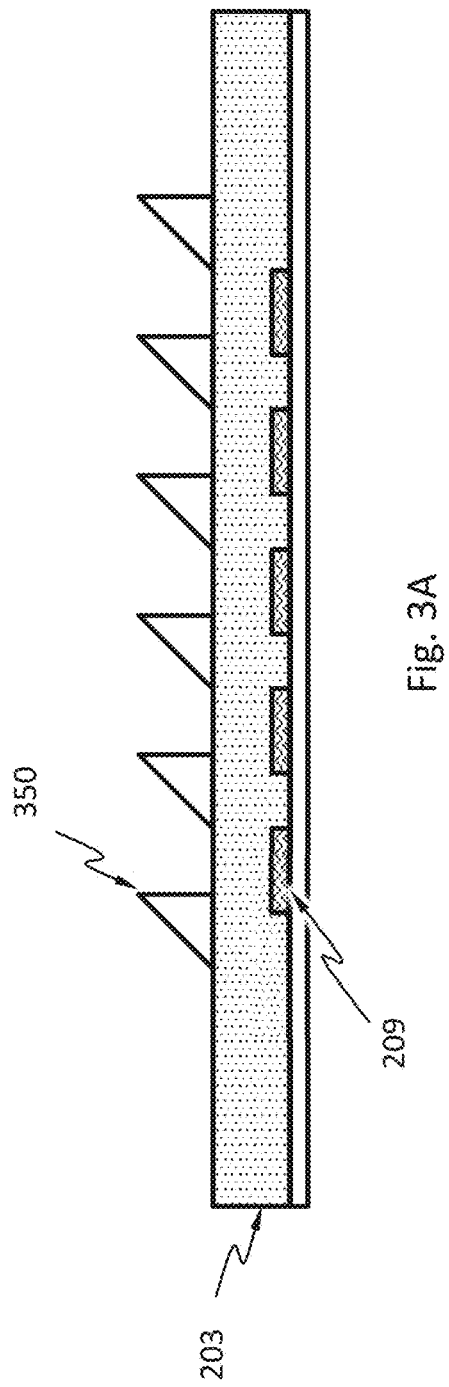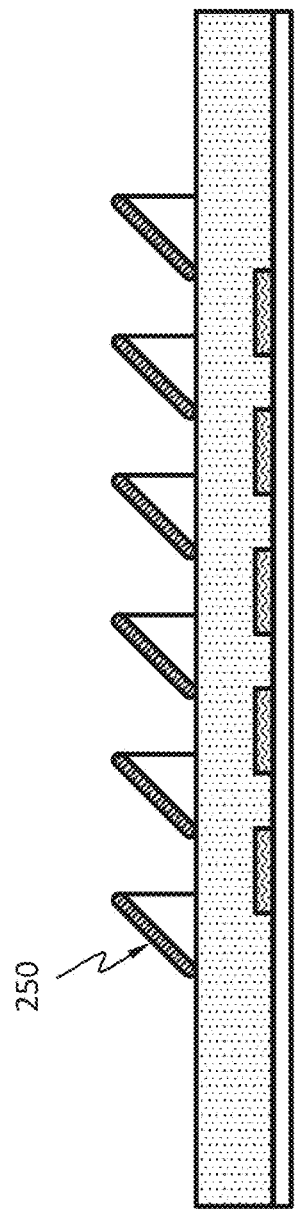
Fig. 3A
Fig. 3B

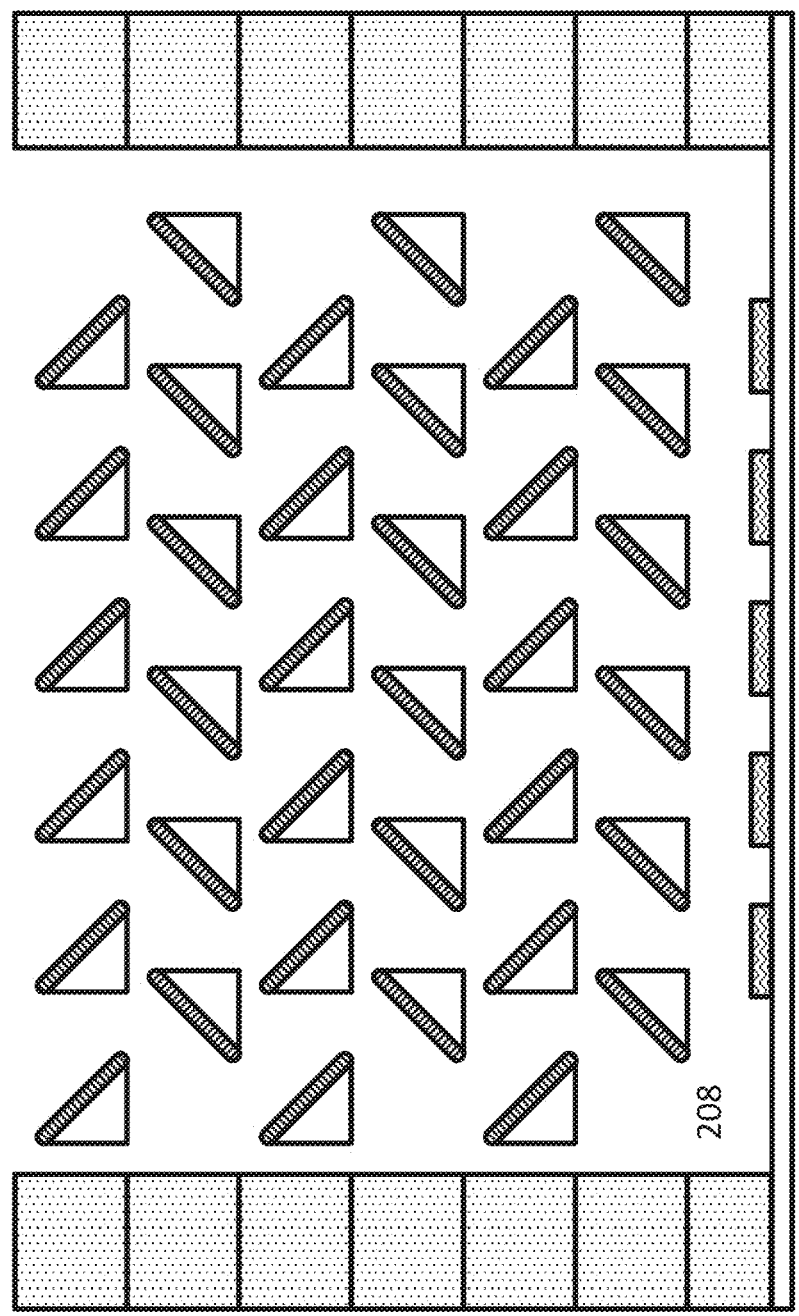

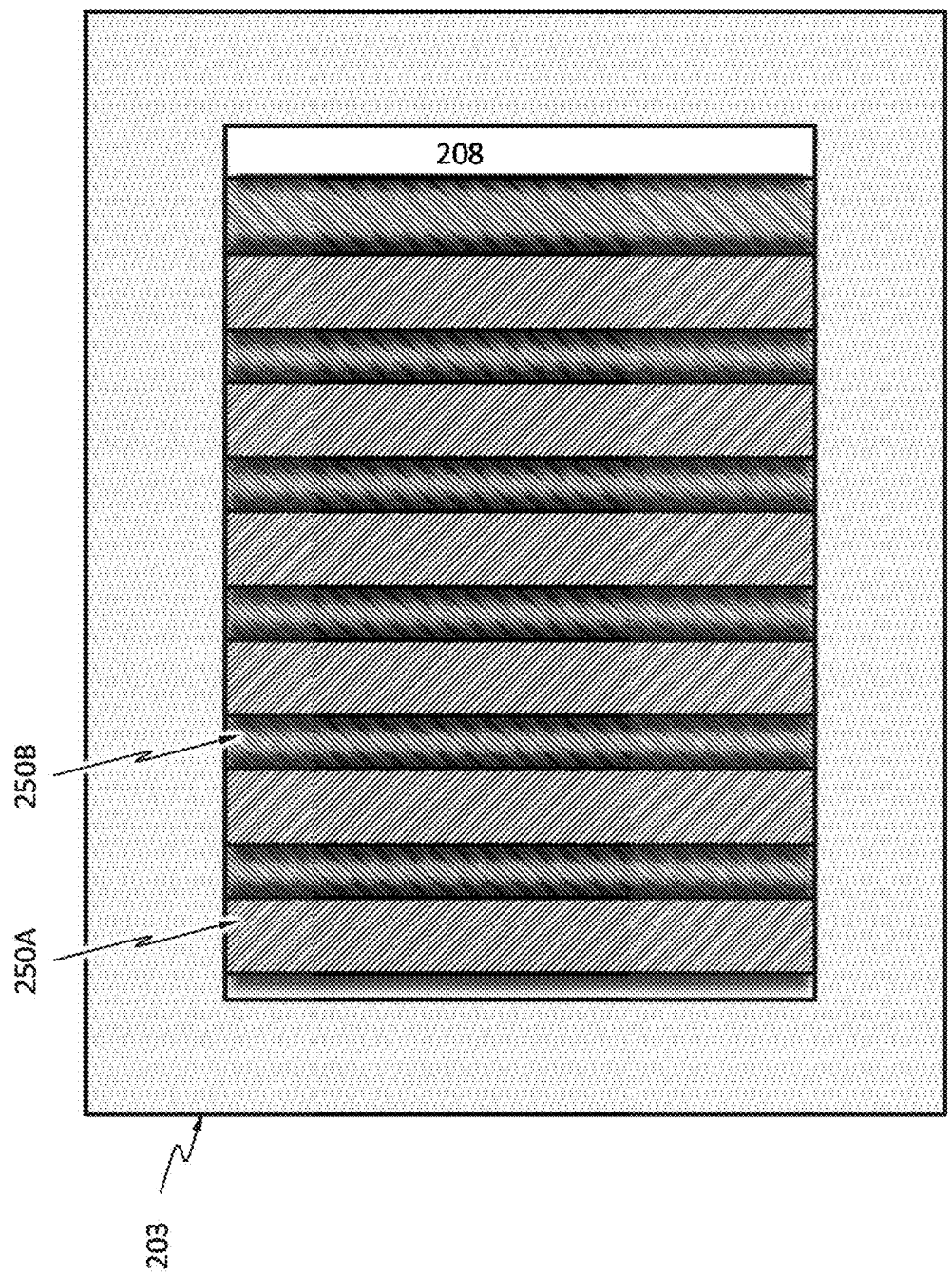

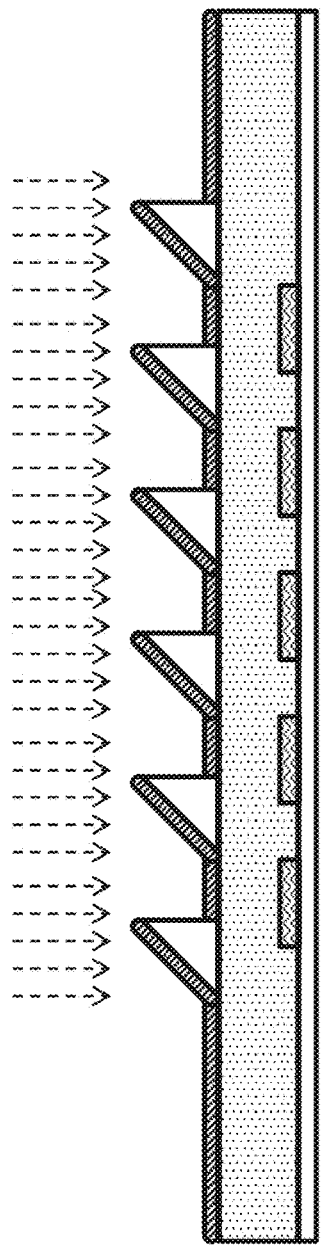
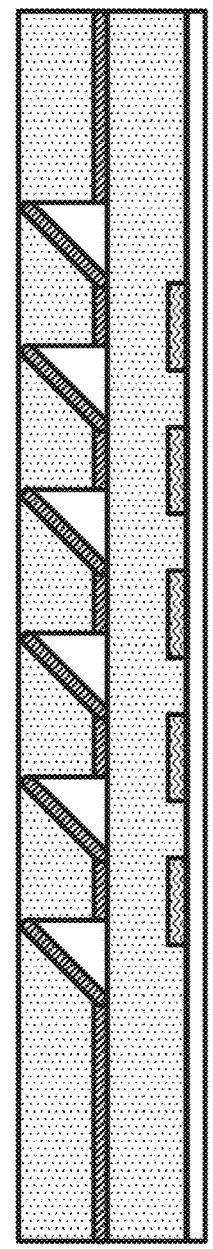
Fig. 6A
Fig. 6B

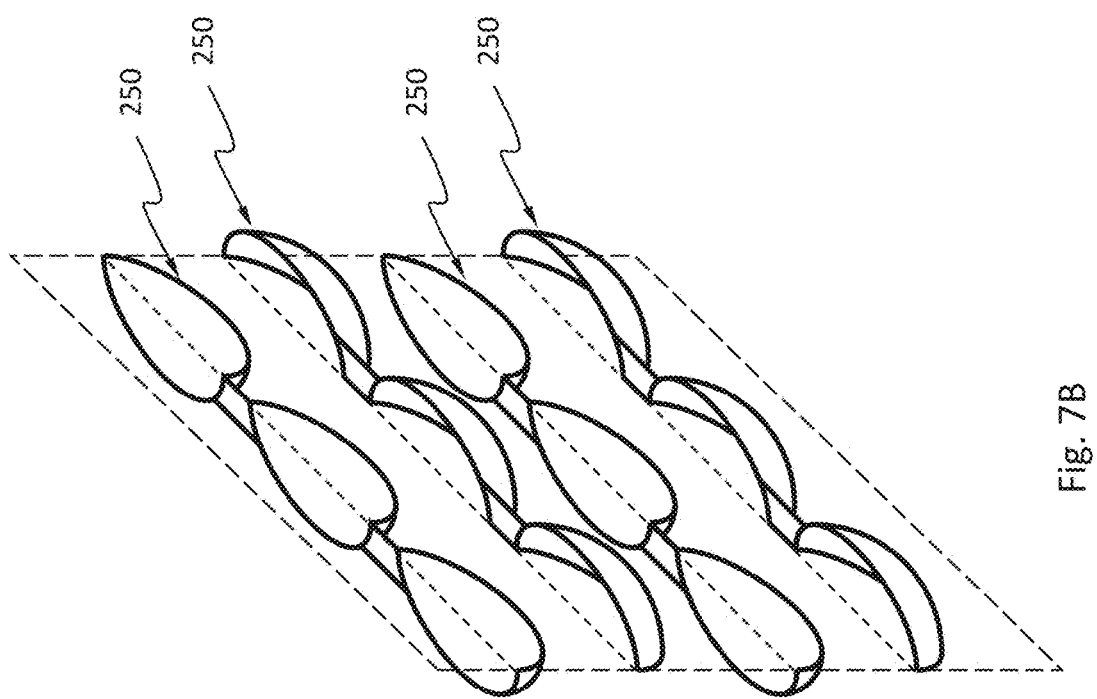

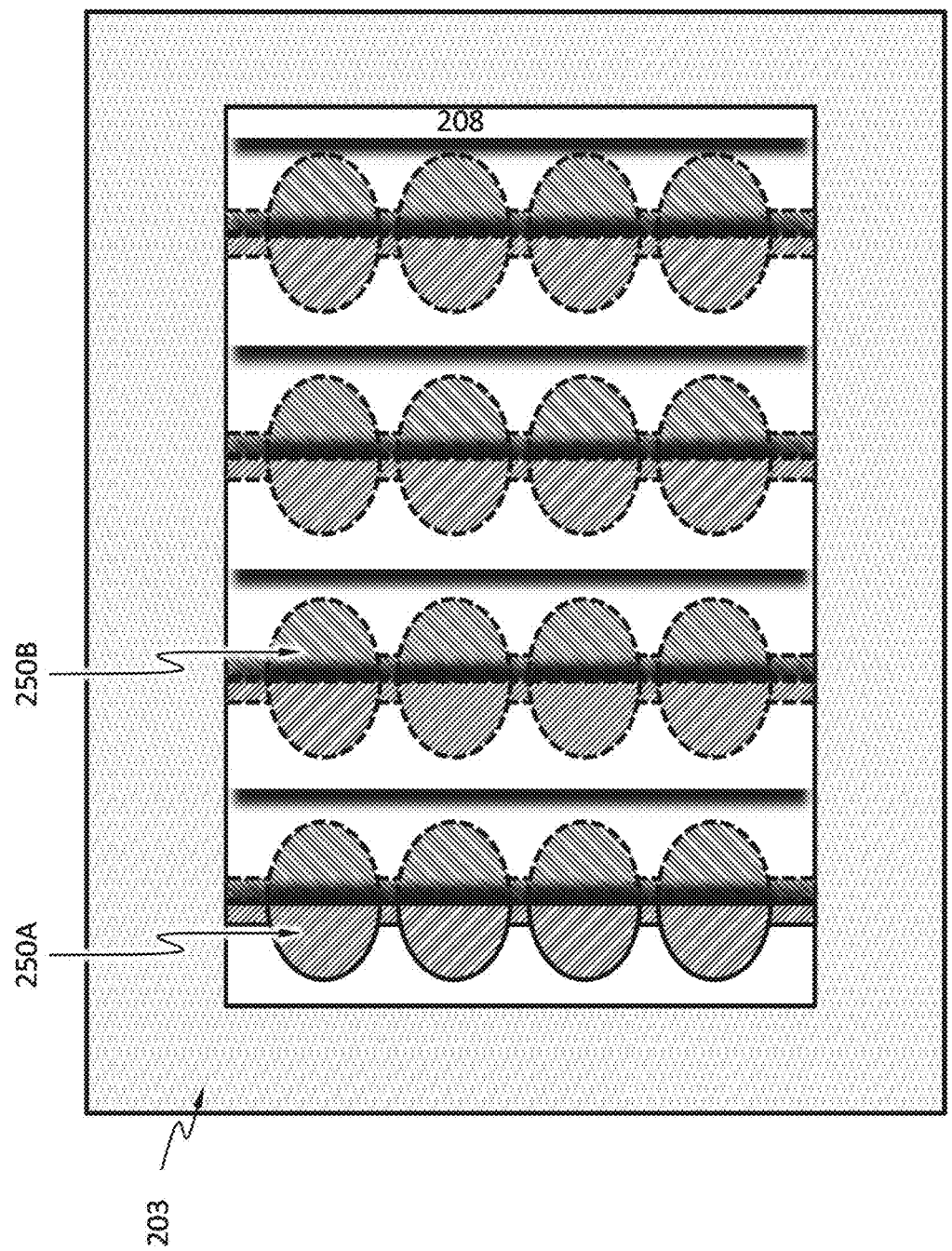

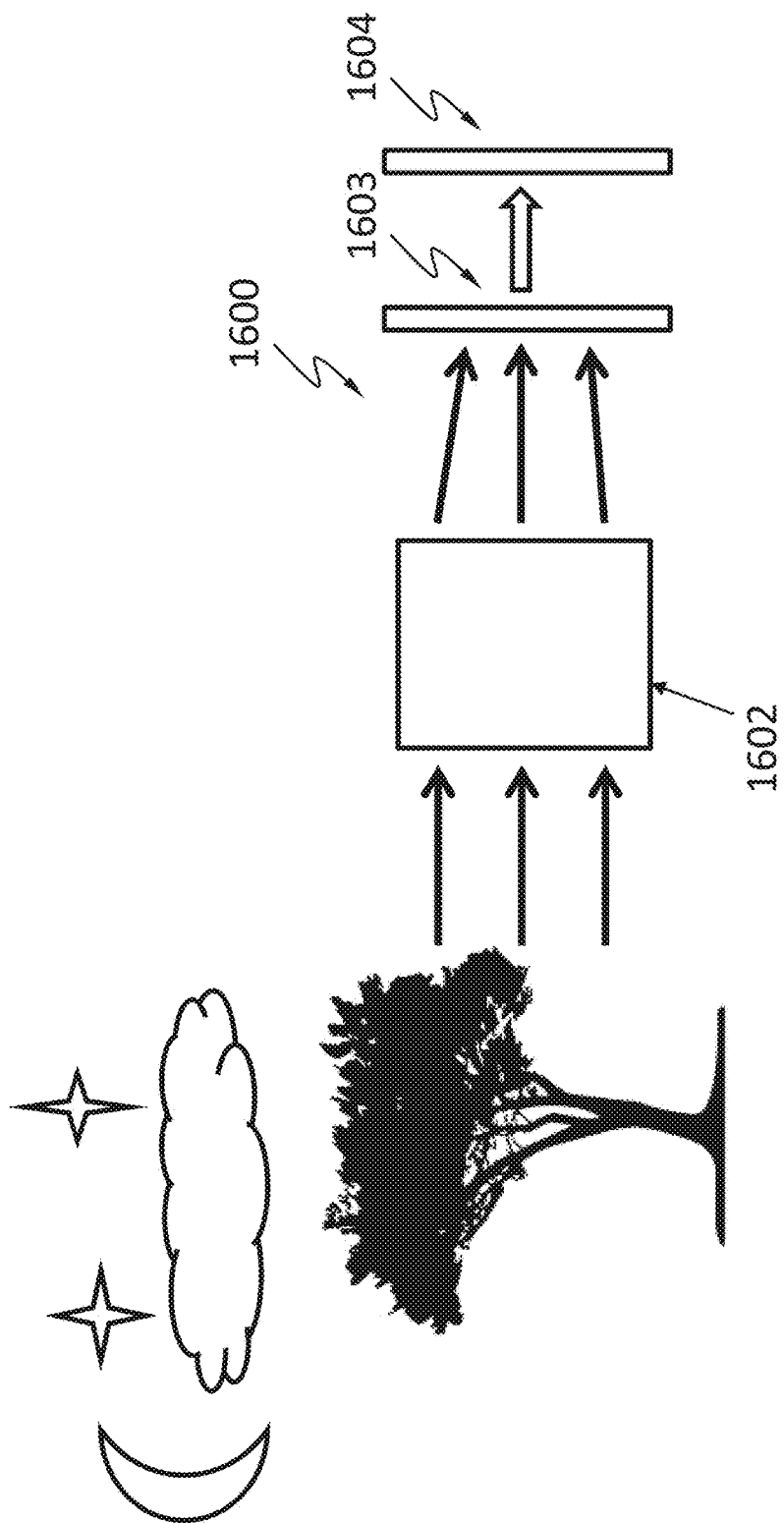

PHOTOMULTIPLIER AND METHODS OF MAKING IT

TECHNICAL FIELD

The disclosure herein relates to photomultipliers.

BACKGROUND

A photomultiplier is a device that able to multiply by many times the photoelectrons produced by incident light. The photomultiplier thus may detect the incident light even when the incident light is very weak. The photomultiplier has important applications in nuclear and particle physics, astronomy, medical diagnostics including blood tests, medical imaging, motion picture film scanning, radar jamming, and high-end image scanners.

FIG. 1 schematically shows a conventional photomultiplier tube (PMT) 100 that includes a housing 101 containing a photocathode 102, several dynodes 104 and an electron collector 110. Light entering the PMT 100 and incident on the photocathode 102 causes photoelectrons to be emitted by the photocathode 102, as a consequence of the photoelectric effect. The photoelectrons emitted by the photocathode 102 may be referred to as primary electrons. The primary electrons impinge on the successive dynodes 104, causing electron multiplication by secondary emission. The electrons emitted from the dynodes 104 may be referred to as secondary electrons. On average, the amount of electrons emitted from each dynode 104 is greater than the amount of electrons impinging on that dynode 104. Secondary electrons emitted from the last dynode are collected by the collector 110 and used for detection of the incident light. Although being widely used, the PMT 100 is large in size, heavy, fragile, expensive and difficult to produce.

SUMMARY

Disclosed herein is a photomultiplier comprising: an electron ejector configured to emit primary electrons in response to incident light onto the electron ejector; a detector configured to collect electrons and provide an output signal representative of the incident light; a substrate; and a first electrode in the substrate and between the electron ejector and the detector, the first electrode configured to emit secondary electrons in response to an electron impinges on the first electrode; a second electrode in the substrate and between the first electrode and the detector, the second electrode configured to emit secondary electrons in response to an electron impinges on the second electrode; a third electrode in the substrate and between the second electrode and the detector, the third electrode configured to emit secondary electrons in response to an electron impinges on the third electrode; wherein each of the first, second and third electrodes comprises a flat or curved surface at an angle to a normal direction of the substrate; wherein each of the first, second and third electrodes comprises a first end and a second end, the first end being closer to the electron ejector than the second end; wherein the first, second and third electrodes are spatially arranged such that the second ends of the first, second and third electrodes are on a same plane, or such that a plane the second ends of the first and third electrodes are on crosses the second electrode.

According to an embodiment, the photomultiplier further comprises a transparent electrode configured to establish an electrical field between the electron ejector and the detector.

According to an embodiment, each of the first, second and third electrodes comprises MgO, alkali antimonide, alkali halide, BeO, GaP, GaAsP, PbO or $Cs_2O$. Other materials not in this list may still be suitable for the electrodes.

According to an embodiment, the detector comprises one or more electrodes and an amplifier electrically connected to the one or more electrodes.

According to an embodiment, the substrate comprises a semiconductor or an insulator.

According to an embodiment, the angle is between 30 and 60 degrees.

According to an embodiment, electron ejector comprises bialkali, multialkali, Ag—O—Cs, Sb—Cs, InGaAs, GaAs, Cs—Te, or Cs—I. Other materials not in this list may still be suitable for the electron ejector.

According to an embodiment, wherein the output signal is a voltage change or a frequency change.

According to an embodiment, the first, second and third electrodes are at least partially exposed.

According to an embodiment, the first, second and third electrodes are partially exposed in a hole in the substrate.

According to an embodiment, the curved surface is a partial cylindrical surface, a partial spherical surface, or a partial ellipsoidal surface.

Disclosed herein is a method for making a photomultiplier, the method comprising: fabricating a first plurality of support structures on a substrate, the support structures having a flat or curved surface at an angle to a normal direction of the substrate; forming a first plurality of electrodes on the flat or curved surface of the first plurality of support structures.

According to an embodiment, fabricating the first plurality of support structures is by micro-imprinting.

According to an embodiment, the method further comprises burying the first plurality of support structures with a layer of material.

According to an embodiment, the method further comprises fabricating a second plurality of support structures on the layer of material, the second plurality of support structures having a flat or curved surface at an angle to a normal direction of the substrate, and further comprising forming a second plurality of electrodes on the flat or curved surface of the second plurality of support structures.

According to an embodiment, the method further comprises at least partially expose the first plurality of electrodes.

According to an embodiment, forming the first plurality of electrodes comprises depositing a material onto the flat or curved surface of the first plurality of support structures at an angle from the normal direction of the substrate.

According to an embodiment, forming the first plurality of electrodes comprises depositing a material onto the flat or curved surface of the first plurality of support structures along the normal direction of the substrate and selectively removing the material on areas between the first plurality of support structures.

Also disclosed herein is a photomultiplier comprising: an electron ejector configured to emit primary electrons in response to incident light onto the electron ejector; a detector configured to collect electrons and provide an output signal representative of the incident light; a substrate; and a first electrode in the substrate and between the electron ejector and the detector, the first electrode configured to emit secondary electrons in response to an electron impinges on the first electrode; a second electrode in the substrate and between the first electrode and the detector, the second electrode configured to emit secondary electrons in response to an electron impinges on the second electrode; wherein each of the first and second electrodes comprises a flat or curved surface at an angle to a normal direction of the substrate; wherein each of the first and second electrodes comprises a first end and a second end, the first end being closer to the electron ejector than the second end; wherein the first and second electrodes are spatially arranged such that the second ends of the first and second electrodes are on a same plane perpendicular to the substrate, or such that the second ends of the first and second electrodes are on different sides of a plane perpendicular to the substrate.

According to an embodiment, the photomultiplier further comprises a transparent electrode configured to establish an electrical field between the electron ejector and the detector.

According to an embodiment, each of the first and second electrodes comprises MgO, alkali antimonide, alkali halide, Bed, GaP, GaAsP, PbO or $Cs_2O$.

According to an embodiment, the detector comprises one or more electrodes and an amplifier electrically connected to the one or more electrodes.

According to an embodiment, the substrate comprises a semiconductor or an insulator.

According to an embodiment, the angle is between 30 and 60 degrees.

According to an embodiment, electron ejector comprises bialkali, multialkali, Ag—O—Cs, Sb—Cs, InGaAs, GaAs, Cs—Te, or Cs—I.

According to an embodiment, the output signal is a voltage change or a frequency change.

According to an embodiment, the first and second electrodes are at least partially exposed.

According to an embodiment, the first and second electrodes are partially exposed in a hole in the substrate.

According to an embodiment, the curved surface is a partial cylindrical surface, a partial spherical surface, or a partial ellipsoidal surface.

Disclosed herein is a night vision device comprising the photomultiplier disclosed herein, wherein the night vision device is configured for detecting a photon from a light source not visible to a naked human eye.

BRIEF DESCRIPTION OF FIGURES

FIG. 1 schematically shows a cross-sectional view of a conventional PMT.

FIG. 3A-FIG. 3F schematically show a fabrication process for the photomultiplier.

FIG. 4 schematically shows a top view of the photomultiplier as made by the process in FIG. 3A-FIG. 3F.

FIG. 6A-FIG. 6E shows another way of forming electrodes on a group of support structures.

FIG. 7B shows an example of the curved surface of the electrodes.

FIG. 8 schematically shows a top view of the photomultiplier where the electrodes have a curved surface.

FIG. 12 schematically shows a system comprising the photomultiplier described herein, according to an embodiment.

DETAILED DESCRIPTION

Figure 2A:
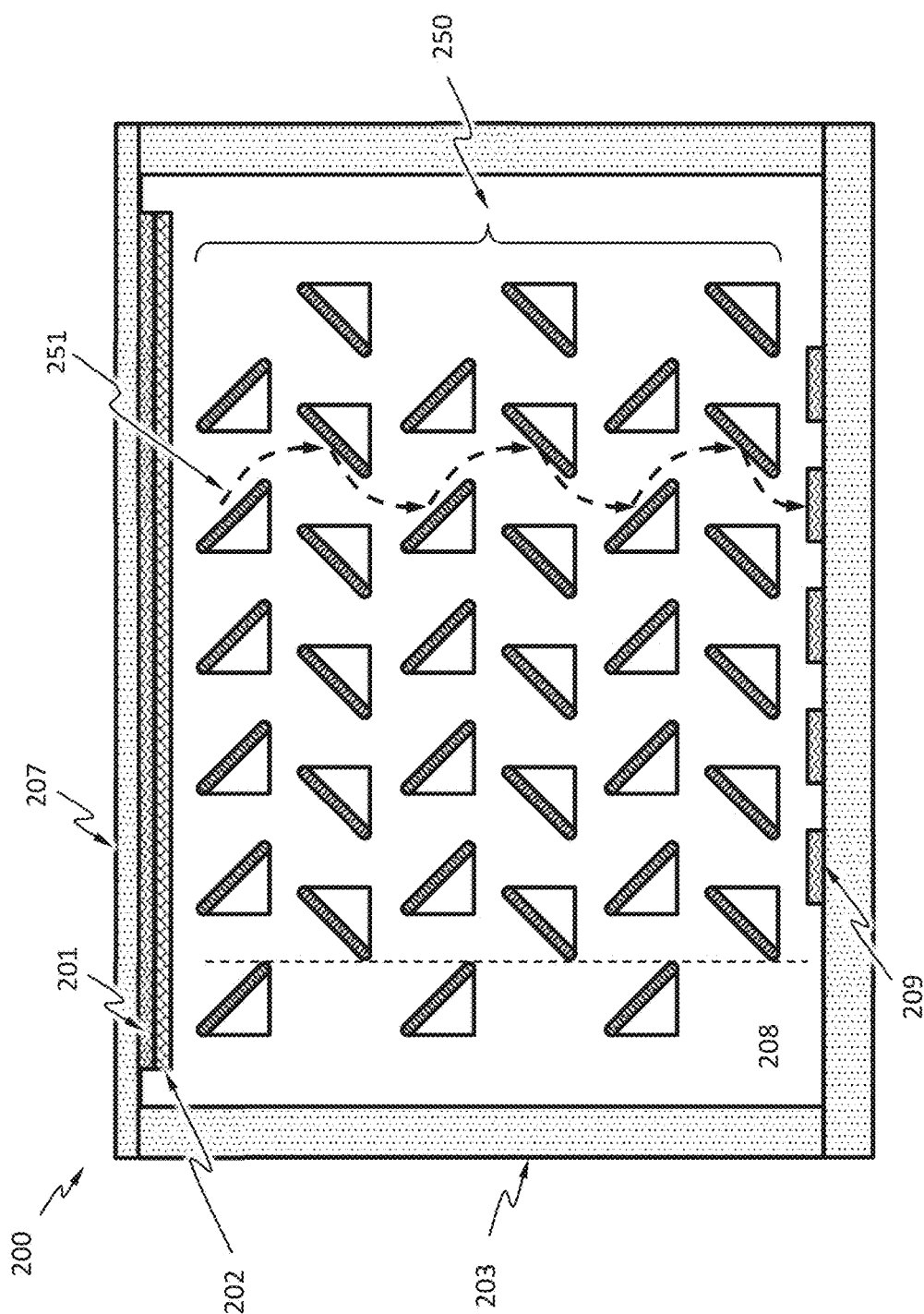
FIG. 2A schematically shows a cross-sectional view of a photomultiplier, according to an embodiment.

FIG. 2A schematically shows a cross-sectional view of photomultiplier 200, according to an embodiment. The photomultiplier 200 may include a transparent electrode 201, an electron ejector 202, a series of electrodes 250, and a detector 209. The electrodes 250 may be in a substrate 203. The electron ejector 202 and the detector 209 may also be on a cap wafer 207.

The transparent electrode 201 allows at least some of the light incident thereon through and to reach the electron ejector 202. The transparent electrode 201 is configured to establish an electrical field between the electron ejector 202 and the detector 209.

The electron ejector 202 is configured to emit photoelectrons when light incidences on the electron ejector 202. The incident light may have to have a wavelength smaller than a threshold in order to cause emission of photoelectrons. The threshold may depend on the material of the electron ejector 202. For example, the incident light may be ultraviolet, visible, or near-infrared light. These photoelectrons emitted from the electron ejector 202 may be called primary electrons. The primary electrons may be driven toward the electrodes 250 by an electrical field established with the transparent electrode 201. The electron ejector 202 may be very thin, e.g. having a thickness of several microns to hundreds of microns. The electron ejector 202 can be made by at least one of the materials: bialkali (such as Na—K—Sb), multialkali (such as Na—K—Sb—Cs), Ag—O—Cs, Sb—Cs, InGaAs, GaAs, Cs—Te, and Cs—I. Other materials not in this list may still be suitable for the electron ejector 202.

The detector 209 may include one or more electron collectors and one or more amplifiers electrically connected to the one or more electron collectors. The electron collectors may be configured to collect the secondary electrons. The one or more amplifiers may be configured to measure the collected secondary electrons and provide an output signal representative of the incident light. In one example, the output signal may indicate a voltage change that can be used to determine an existence of the incident light. The detector 209 may be formed at the bottom of the hole 208. Instead of including amplifiers, the detector 209 may include an oscillator for providing an output signal representative of the incident photon. In contrast to an amplifier that generates a voltage change, an oscillator can generate a frequency change to detect an incoming signal.

The electrodes 250 may be at least partially exposed (e.g., in a hole 208 in the substrate 203). The electrodes 250 may be arranged between the electron ejector 202 and the detector 209. When a primary electron reaches one of the electrodes 250, it may cause emission of more than one secondary electron from that electrode. The secondary electrons then move under the electrical field and reach another one of the electrodes 250 and cause emission of more secondary electrons. The secondary electrons cascade under the electrical field following a path such as the path 251, from one electrode to another, and may be multiplied at each of the electrodes the secondary electrons reach.

Among the electrodes 250, an electrode farther from the electron ejector 202 may be held at a more positive electric potential than an electrode closer to the electron ejector 202 during use of the photomultiplier 200.

The electrodes 250 may include MgO, alkali antimonide, alkali halide, BeO, GaP, GaAsP, PbO or $Cs_2O$ or another material to facilitate emission of secondary electrons, by lowering the work function of the surface of the electrodes 250.

The electrodes 250 may have a flat or curved surface at an angle to a normal direction of the substrate 203. Here, the phrase "at an angle" means that the surface is neither parallel nor perpendicular to the normal direction. In an embodiment, the electrodes 250 may be parallel or perpendicular to the normal direction of the substrate 203.

Figure 2C:
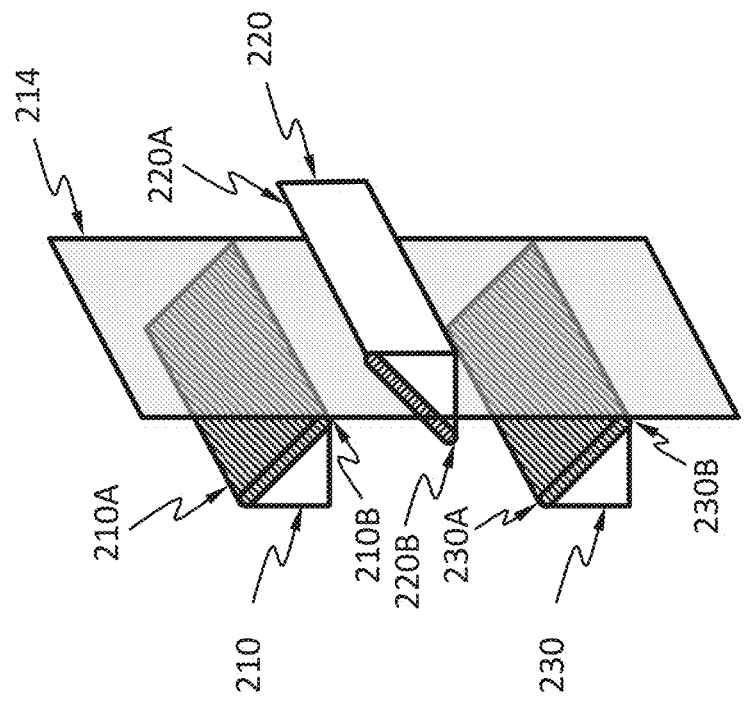
FIG. 2B and FIG. 2C each schematically show a perspective view of a subset of the electrodes in the photomultiplier of FIG. 2A.
Figure 2B:
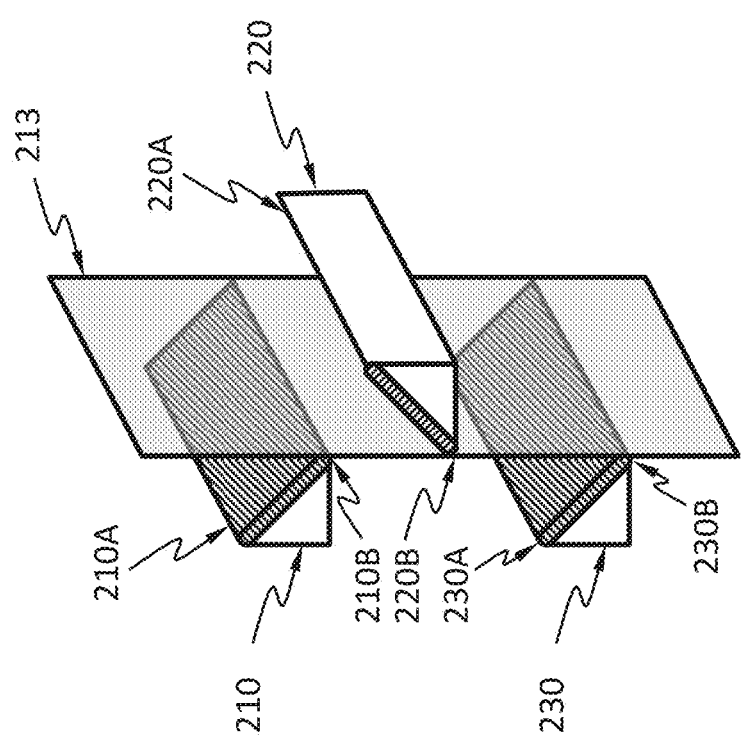

FIG. 2B and FIG. 2C each schematically show a perspective view of a subset of the electrodes 250, the subset including a first electrode 210, a second electrode 220 and a third electrode 230, according to an embodiment. The first electrode 210, the second electrode 220 and the third electrode 230 are arranged at different distances from the detector 209. The first electrode 210 is farther from the detector 209 than the second electrode 220; and the second electrode 220 is farther from the detector 209 than the third electrode 230. The first electrode 210 is closer to the electron ejector 202 than the second electrode 220; and the second electrode 220 is closer to the electron ejector 202 than the third electrode 230. The first electrode 210 has a first end 210A and a second end 210B; the second electrode 220 has a first end 220A and a second end 220B; and the third electrode 230 has a first end 230A and a second end 230B. The first end 210A is closer to the electron ejector 202 than the second end 210B; the first end 220A is closer to the electron ejector 202 than the second end 220B; the first end 230A is closer to the electron ejector 202 than the second end 230B. The first electrode 210, the second electrode 220 and the third electrode 230 are spatially arranged such that the second ends 210B, 220B and 230B are on the same plane 213, as shown in FIG. 2B, or such that a plane 214 spanning the second ends 210B and 230B crosses the second electrode 220, as shown in FIG. 2C.

Figure 2E:
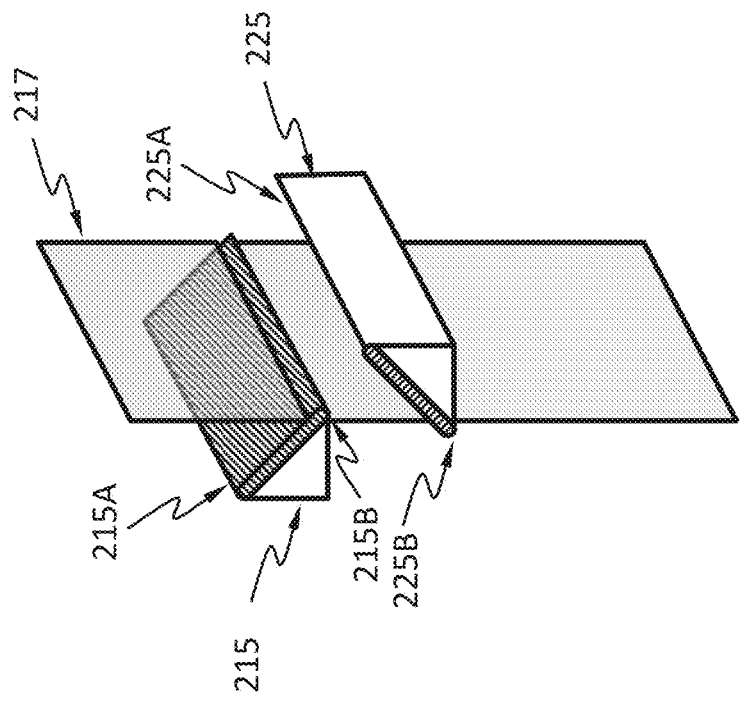
FIG. 2D and FIG. 2E each schematically show a perspective view of a subset of the electrodes in the photomultiplier of FIG. 2A.
Figure 2D:
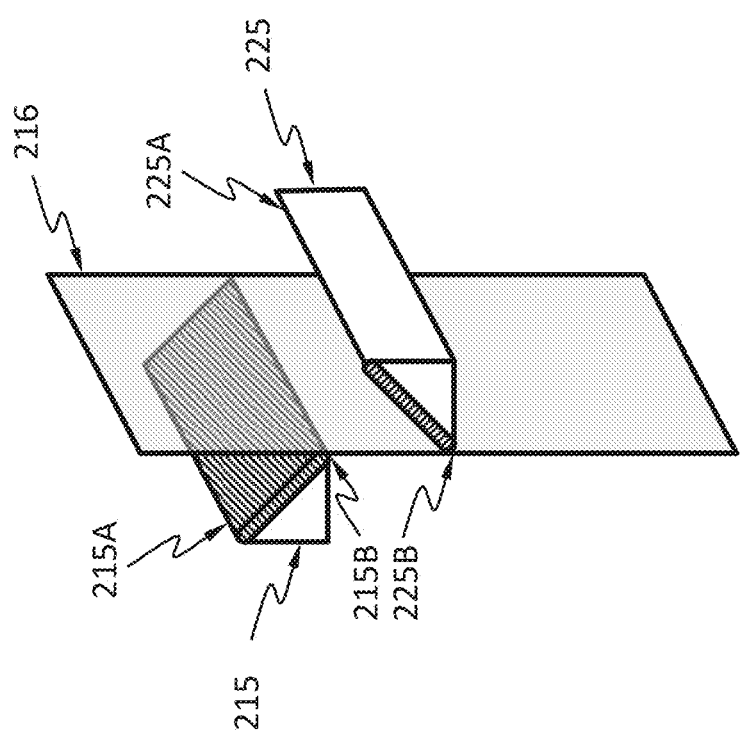

FIG. 2D and FIG. 2E each schematically show a perspective view of a subset of the electrodes 250, the subset including a first electrode 215, and a second electrode 225, according to an embodiment. The first electrode 215 and the second electrode 225 are arranged at different distances from the detector 209. The first electrode 215 is farther from the detector 209 than the second electrode 225. The first electrode 215 is closer to the electron ejector 202 than the second electrode 225. The first electrode 215 has a first end 215A and a second end 215B; the second electrode 225 has a first end 225A and a second end 225B. The first end 215A is closer to the electron ejector 202 than the second end 215B; the first end 225A is closer to the electron ejector 202 than the second end 225B. The first electrode 215 and the second electrode 225 are spatially arranged such that the second ends 215B and 225B are on the same plane 216 perpendicular to the substrate 203, as shown in FIG. 2D, or such that the second ends 215B and 225B are different sides of a plane 217 perpendicular to the substrate 203, as shown in FIG. 2E.

Figure 3C:
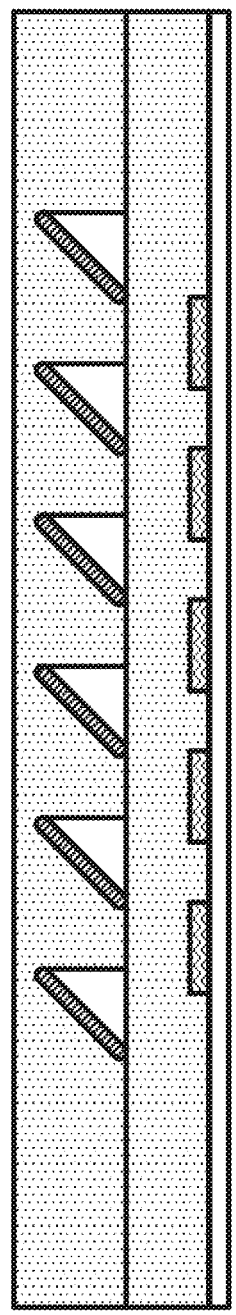
Figure 3D:
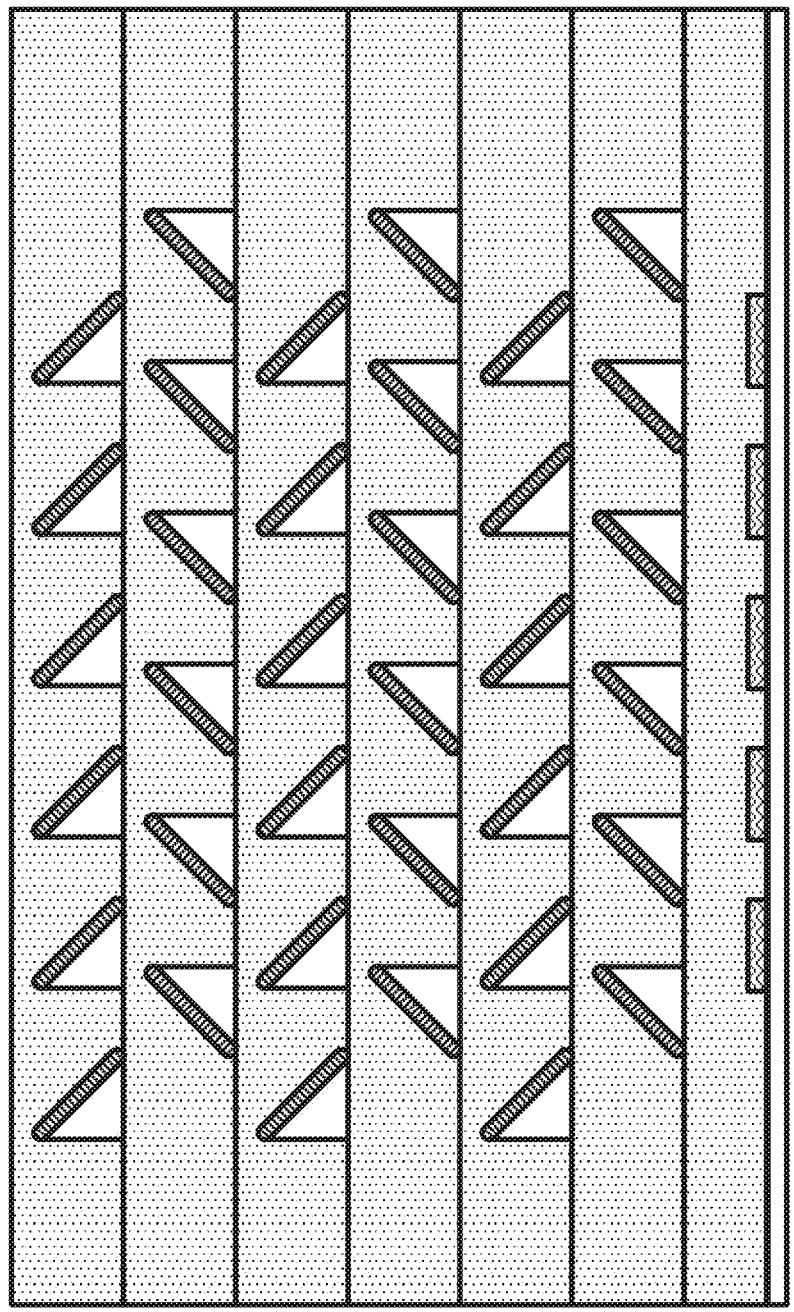
Figure 3F:
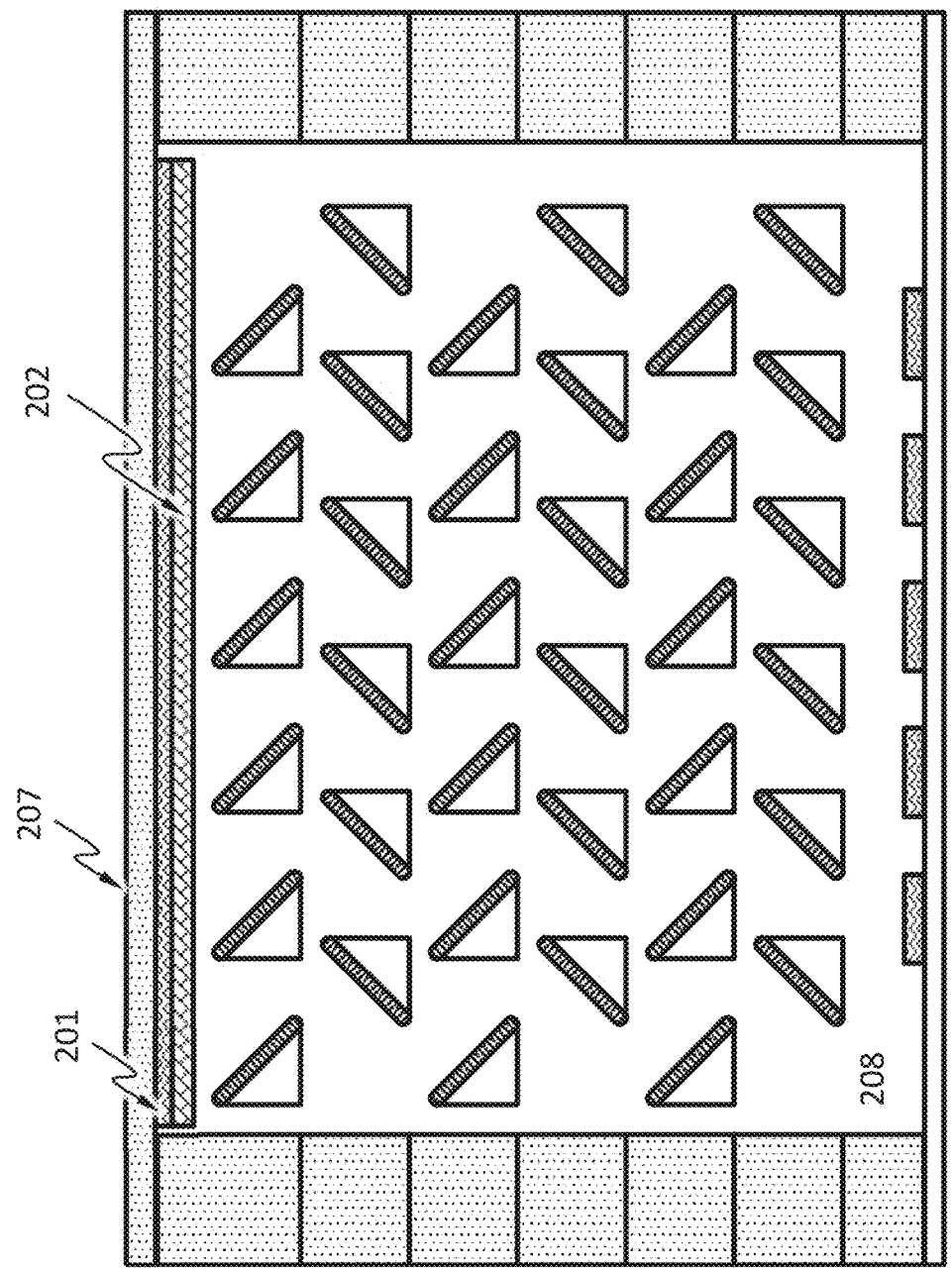

FIG. 3A-FIG. 3F schematically show a fabrication process for the photomultiplier 200. As shown in FIG. 3A, a group of support structures 350 are fabricated on the substrate 203 with the detector 209 thereon. The support structures 350 have a flat or curved surface at an angle to a normal direction of the substrate 203. One way of making the support structures 350 is micro-imprinting. Micro-imprinting is a method of fabricating micrometer scale structures. Micro-imprinting creates structures by mechanical deformation of imprint resist with a template carrying the inverse of the structures. The imprint resist may be a monomer or polymer formulation that is curable by heat or UV light during the imprinting. Adhesion between the resist and the template is controlled to allow proper release. As shown in FIG. 3B, the electrodes 250 are formed on the flat or curved surface of the support structures 350. For example, the electrodes 250 may be formed by depositing a layer of appropriate material on the flat or curved surface. As shown in FIG. 3C, the support structures 350 and the electrodes 250 are buried with a layer of material (e.g., polymer or oxide). As shown in FIG. 3D, additional layers of the electrodes 250 may be fabricated by repeating the steps of fabricating support structures, forming electrodes thereon and burying the support structures and electrodes. As shown in FIG. 3E, the hole 208 is formed to at least partially expose the electrodes 250. The hole 208 may be formed by removing the layers of material burying the supporting structures 350 and the electrode 250 by etching. As shown in FIG. 3F, a cap wafer 207 with the electron ejector 202 and transparent electrode 201 is placed over the hole 208.

FIG. 4 schematically shows a top view of the photomultiplier 200 as made by the process in FIG. 3A-FIG. 3F, with the cap wafer 207, the electron ejector 202 and transparent electrode 201 omitted. Two layers of electrodes among the electrodes 250 are visible—the top-most layer of electrodes 250A and the layer 250B immediately below.

Figure 5:
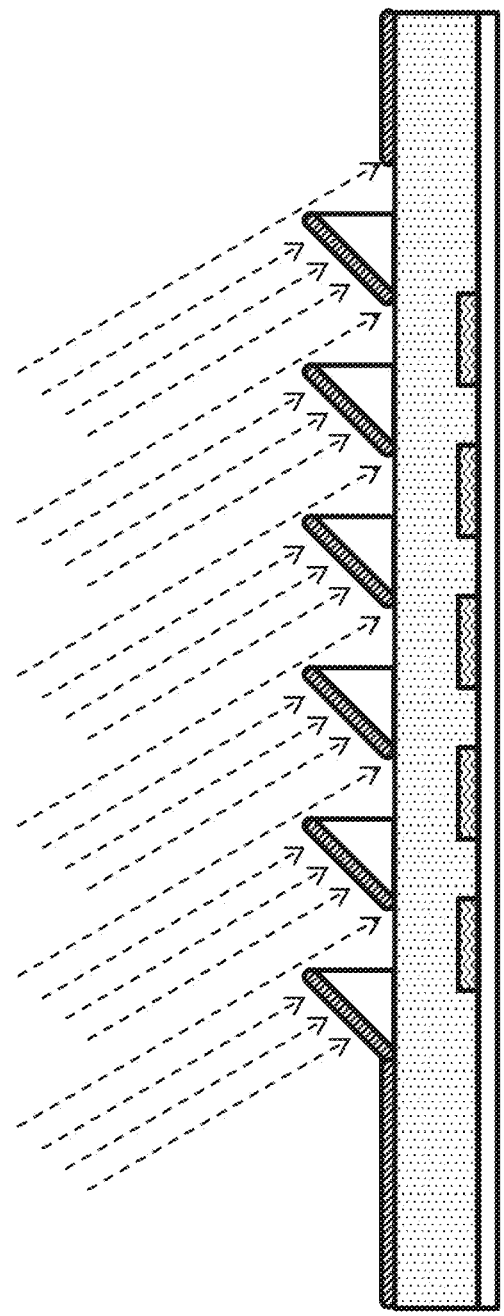
FIG. 5 shows one way of forming electrodes on a group of support structures.

FIG. 5 shows one way of forming the electrodes 250 on the support structures 350. A layer of appropriate material is deposited onto the flat or curved surface of the support structures 350 at an angle from the normal direction of the substrate 203 such that the finite height of the support structures 350 casts a shadow over the areas between the support structures 350 and thus leaves the areas free of the deposited material.

Figure 6C:
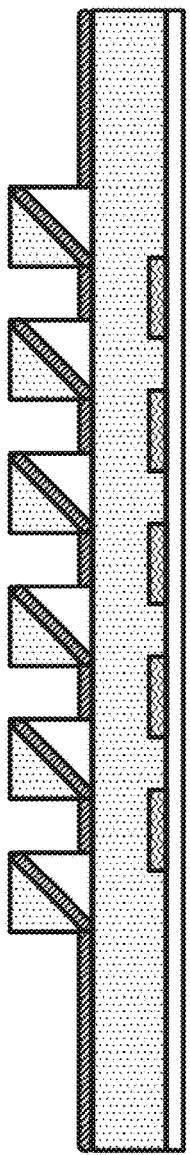
Figure 6D:
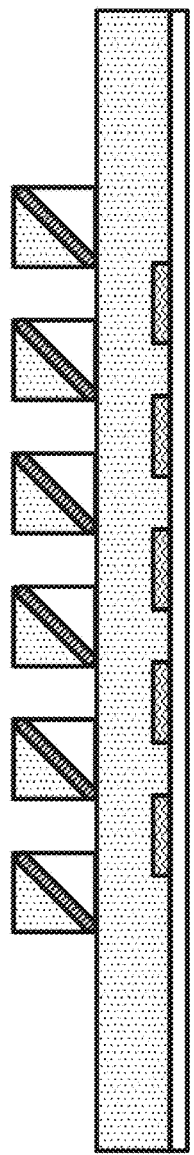
Figure 6E:
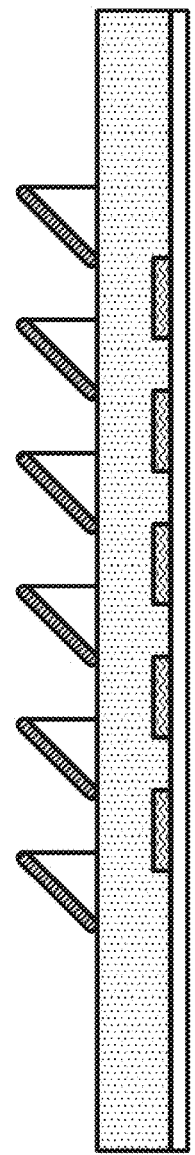

FIG. 6A-FIG. 6E shows another way of forming the electrodes 250 on the support structures 350. As shown in FIG. 6A, a layer of appropriate material is deposited on the flat or curved surface of the support structures 350 along the normal direction of the substrate 203. The areas between the support structures 350 are thus also covered by the layer of material. As shown in FIG. 6B, a layer of photoresist is deposited over the support structures 350. As shown in FIG. 6C, lithography is performed and the areas between the support structures 350 are exposed. As shown in FIG. 6D, the layer of material on the areas between the support structures 350 is removed. As shown in FIG. 6E, the photoresist is removed.

Figure 7A:
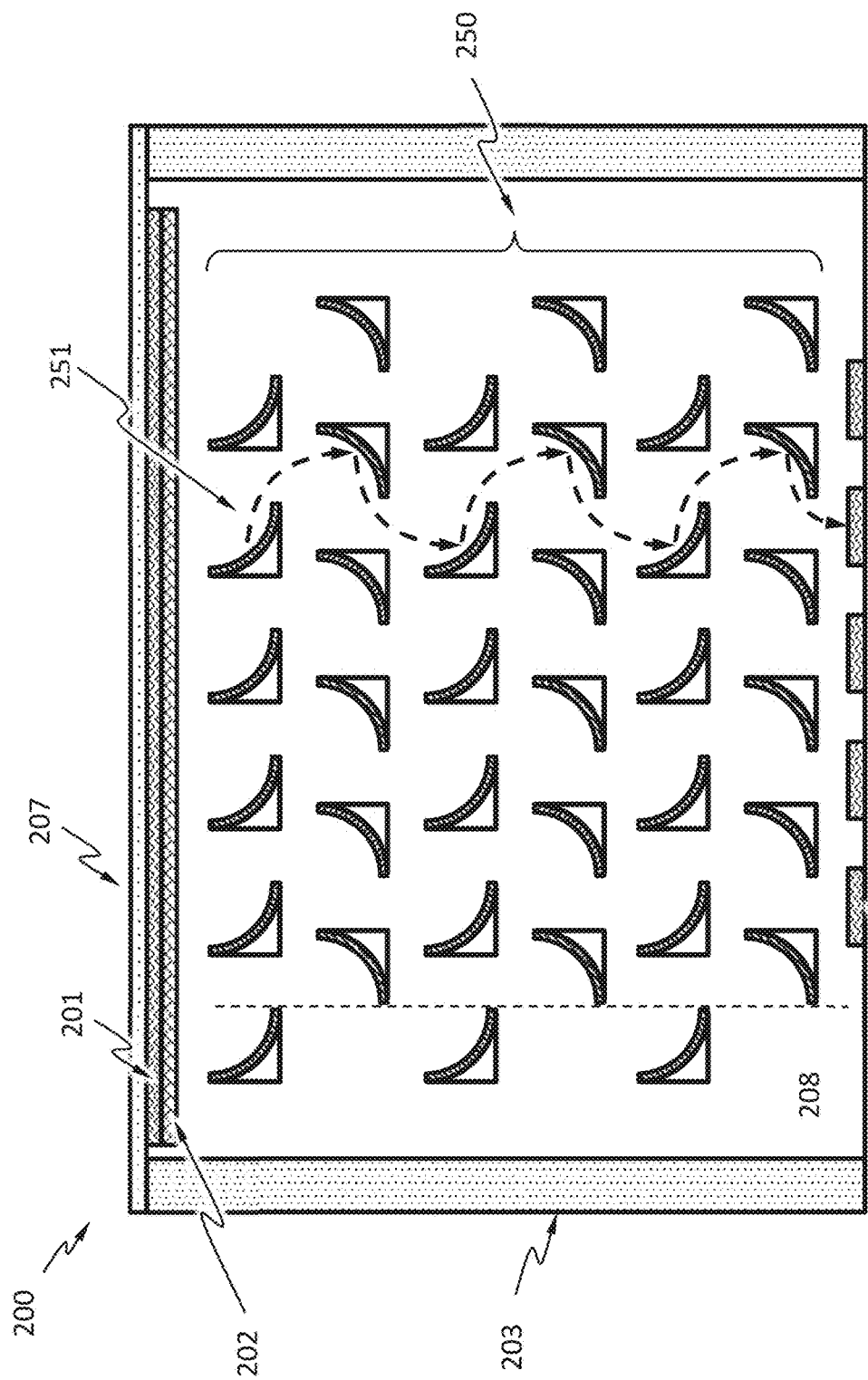
FIG. 7A shows schematically shows a cross-sectional view of photomultiplier.

FIG. 7A shows schematically shows a cross-sectional view of photomultiplier 200, according to an embodiment, where the electrodes 250 have a curved surface. The curved surface may be a partial cylindrical surface or, as shown in FIG. 7B, a partial spherical or ellipsoidal surface.

FIG. 8 schematically shows a top view of the photomultiplier 200 where the electrodes 250 have a curved surface, with the cap wafer 207, the electron ejector 202 and transparent electrode 201 omitted. Two layers of electrodes among the electrodes 250 are visible—the top-most layer of electrodes 250A and the layer 250B immediately below.

Figure 9:
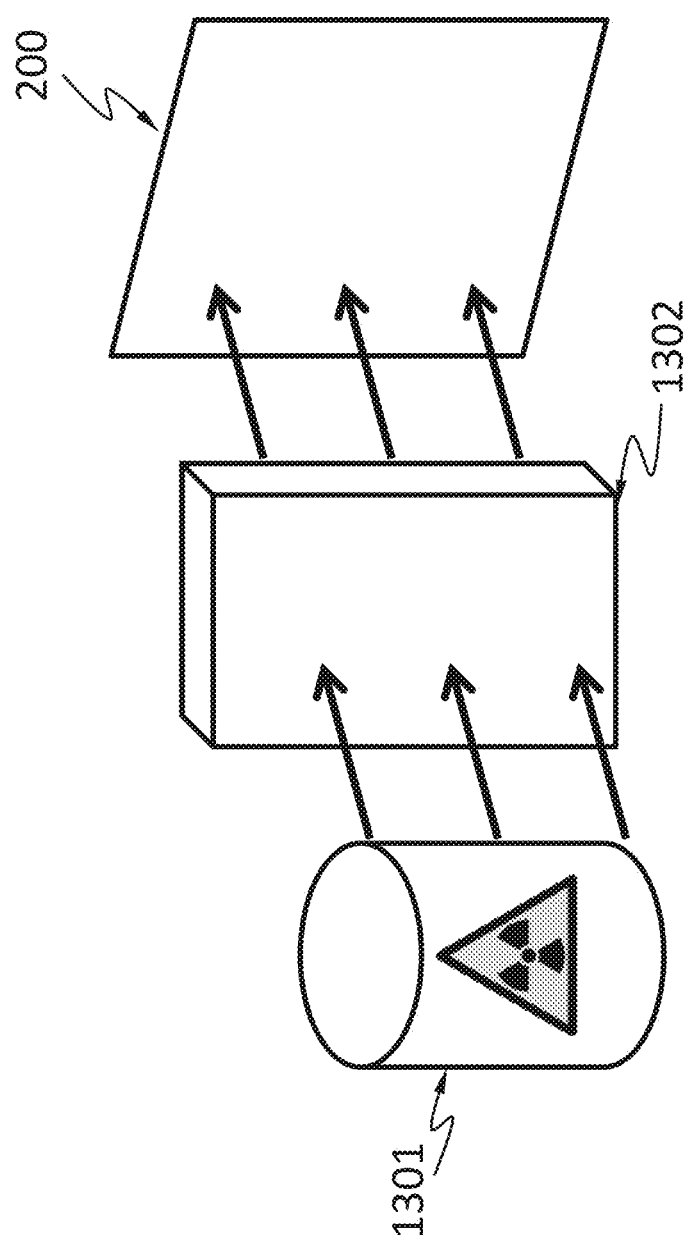
FIG. 9 schematically shows a system comprising the photomultiplier described herein, according to an embodiment.

FIG. 9 schematically shows a system comprising the photomultiplier described herein, according to an embodiment. The system may be used for detecting ionizing radiation from a source 1301. The system comprises a scintillator 1302 and the photomultiplier 200 described herein. The scintillator 1302 may absorb Gamma rays, X-rays, and the higher ultraviolet part of the electromagnetic spectrum that are radiated from the source 1301, and emit visible light, which can then be detected by the photomultiplier 200. The scintillator 1302 may include sodium iodide.

Figure 10:
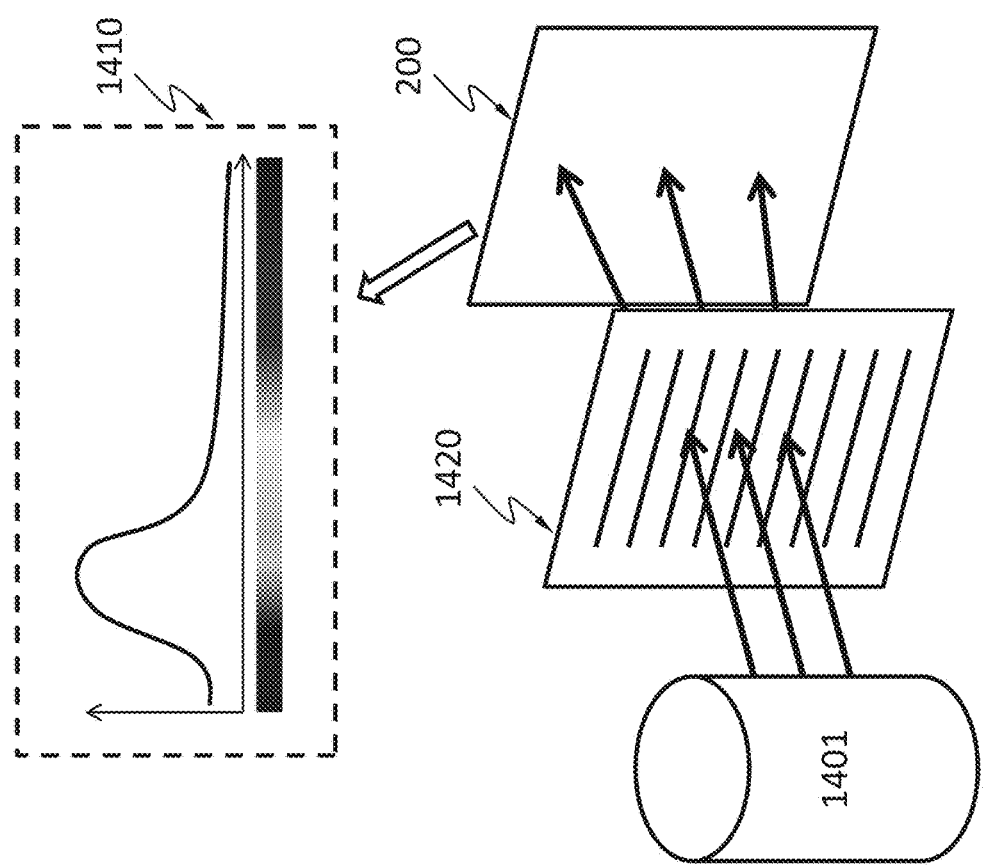
FIG. 10 schematically shows a system comprising the photomultiplier described herein, according to an embodiment.

FIG. 10 schematically shows a system comprising the photomultiplier 200 described herein, according to an embodiment of the present teaching. The system may be used for measuring the intensity and spectrum of a light-emitting material 1401. The light-emitting material 1401 may be a compound semiconductor or a quantum dot that emits light. With the photomultiplier 200 described herein, the system in FIG. 10 may measure the spectrum 1410 of the light emitted by the light-emitting material 1401 by spreading the light with a prism or diffraction grating 1420 and detecting the light with the photomultiplier 200.

Figure 11:
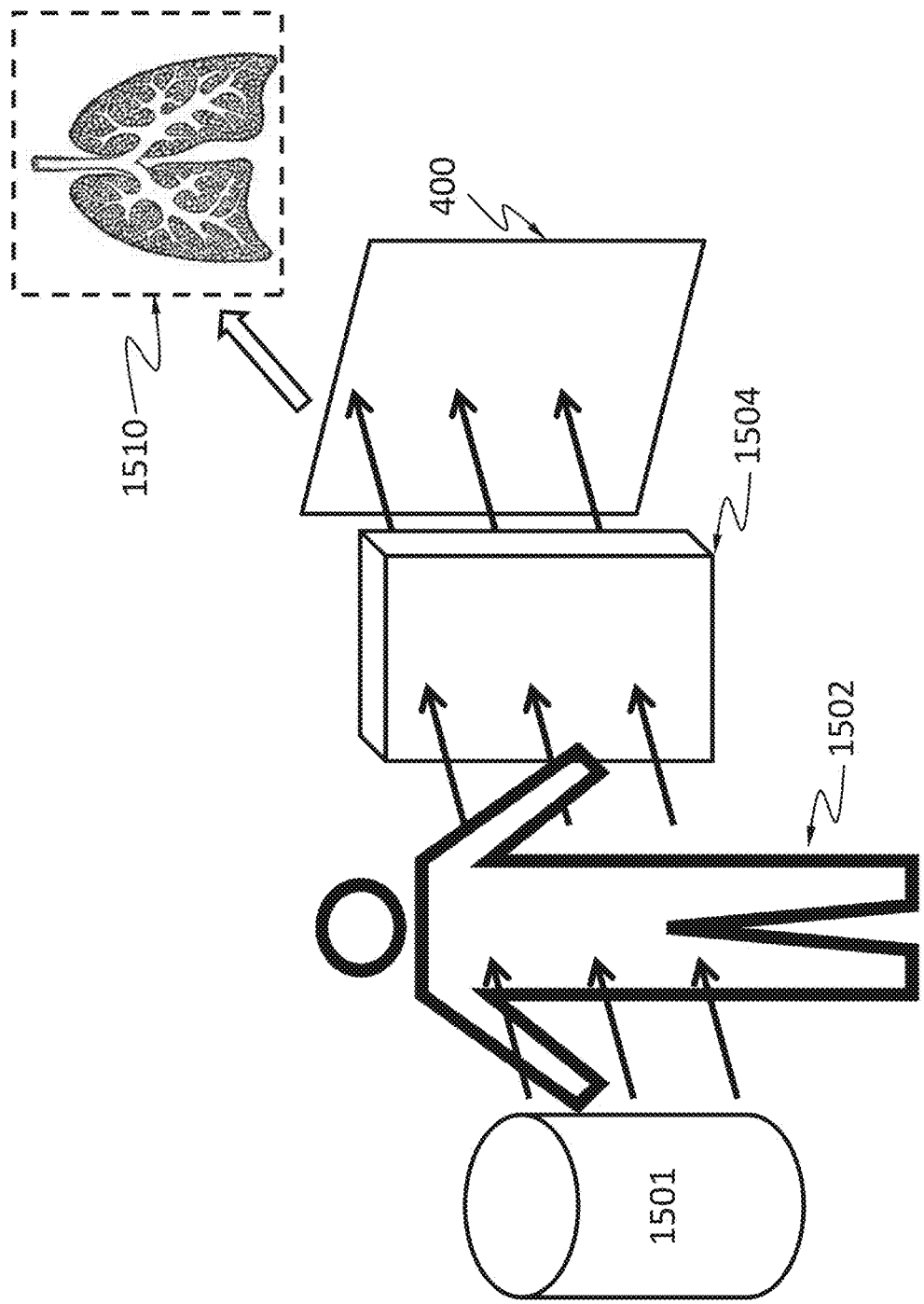
FIG. 11 schematically shows a system comprising the photomultiplier described herein, according to an embodiment.

FIG. 11 schematically shows a gamma camera comprising the photomultiplier described herein, according to an embodiment of the present teaching. The gamma camera here includes a Gamma ray source 1501, a scintillator 1504, and an array 400 of photomultipliers which may be the photomultipliers 200 as disclosed herein. The gamma camera may be used for imaging gamma radiation in medical applications. As shown in FIG. 11, Gamma rays emitted from the Gamma ray source 1501 penetrate a human 1502, are attenuated by different degrees by the internal structures of the human 1502 (e.g., bones, muscle, fat and organs, etc.), are converted into visible lights by the scintillator 1504, and are projected to the photomultiplier array 400. The gamma camera may form an image of the human's body part (e.g. a lung image 1510) by detecting the intensity distribution of the Gamma rays.

FIG. 12 schematically shows a night vision device 1600 comprising the photomultiplier described herein, according to an embodiment of the present teaching. The night vision device 1600 may be capable of producing images of a scene with levels of light approaching total darkness, e.g. when the visible light intensity is about 5 orders of magnitude less than that during the day time. The night vision device 1600 may detect weak visible light or infrared and produce images in visible light perceivable by human eyes. In this example, the night vision device 1600 includes an optical system 1602 configured to form an optical image of a scene and an image sensor 1603 with an array of the photomultipliers 200 as disclosed herein. The photomultipliers detect the local light intensities of the optical image and convert the intensities into electrical signals. The electrical signals may then be presented on a display 1604 perceivable by human eyes.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A photomultiplier comprising:
an electron ejector configured to emit primary electrons in response to incident light onto the electron ejector;
a detector configured to collect electrons and provide an output signal representative of the incident light;
a substrate; and
a first electrode in the substrate and between the electron ejector and the detector, the first electrode configured to emit secondary electrons in response to the primary electrons impinging on the first electrode;
a second electrode in the substrate and between the first electrode and the detector, the second electrode configured to emit secondary electrons in response to the secondary electrons from the first electrode impinging on the second electrode;
a third electrode in the substrate and between the second electrode and the detector, the third electrode configured to emit secondary electrons in response to the secondary electrons from the second electrode impinging on the third electrode;
wherein each of the first, second and third electrodes comprises a flat or curved surface at an angle to a normal direction of the substrate;
wherein each of the first, second and third electrodes comprises a first end and a second end, the first end being closer to the electron ejector than the second end;
wherein the first, second and third electrodes are spatially arranged such that the second ends of the first, second and third electrodes are on a same plane, or such that the second ends of the first and the third electrodes are on a plane that crosses the second electrode.

2. The photomultiplier of claim 1, further comprising a transparent electrode configured to establish an electrical field between the electron ejector and the detector.

3. The photomultiplier of claim 1, wherein each of the first, second and third electrodes comprises MgO, alkali antimonide, alkali halide, BeO, GaP, GaAsP, PbO or $Cs_2O$.

4. The photomultiplier of claim 1, wherein the detector comprises one or more electrodes and an amplifier electrically connected to the one or more electrodes.

5. The photomultiplier of claim 1, wherein the substrate comprises a semiconductor or an insulator.

6. The photomultiplier of claim 1, wherein the angle is between 30 and 60 degrees.

7. The photomultiplier of claim 1, wherein electron ejector comprises bialkali, multialkali, Ag—O—Cs, Sb—Cs, InGaAs, GaAs, Cs—Te, or Cs—I.

8. The photomultiplier of claim 1, wherein the output signal is a voltage change or a frequency change.

9. The photomultiplier of claim 1, wherein the first, second and third electrodes are at least partially exposed.

10. The photomultiplier of claim 9, wherein the first, second and third electrodes are partially exposed in a hole in the substrate.

11. The photomultiplier of claim 1, wherein the curved surface is a partial cylindrical surface, a partial spherical surface, or a partial ellipsoidal surface.

12. A night vision device comprising:
the photomultiplier of claim 1,
wherein the night vision device is configured for detecting a photon from a light source not visible to a naked human eye.

* * * * *